United States Patent [19]

Ho et al.

[11] Patent Number: 5,317,596
[45] Date of Patent: May 31, 1994

[54] METHOD AND APPARATUS FOR ECHO CANCELLATION WITH DISCRETE MULTITONE MODULATION

[75] Inventors: Minnie Ho, Stanford; John M. Cioffi, Cupertino, both of Calif.

[73] Assignee: The Board of Trustees of the Leland Stanford, Junior University, Stanford, Calif.

[21] Appl. No.: 984,938

[22] Filed: Dec. 1, 1992

[51] Int. Cl.⁵ .................. H03H 7/30; H03H 7/40; H03K 5/159; H04J 1/00
[52] U.S. Cl. .................. 375/14; 370/32.1; 379/410; 379/411
[58] Field of Search .............. 370/32.1, 32; 379/410, 379/411; 375/12, 14, 7, 8, 99

[56] References Cited

U.S. PATENT DOCUMENTS 5,166,924 11/1992 Moose ................... 379/410

Primary Examiner—Stephen Chin
Assistant Examiner—Duane Kobayashi
Attorney, Agent, or Firm—Claude A. S. Hamrick

[57] ABSTRACT

A method of echo cancellation in a full-duplex data communication system with discrete multitone modulation, comprised of an initial step of initializing a set of frequency-domain echo parameters and a set of corresponding time-domain echo parameters, and further including the repeating steps of block multiplying a frequency-domain transmit block of a transmitted signal by the set of frequency-domain echo parameters to produce a frequency-domain echo, converting the frequency-domain transmit block to a time-domain transmit block, subtracting the end of the previous time-domain transmit block from the end of the current time-domain transmit block, performing a convolution of the adjusted time-domain transmit block and the time-domain echo parameters to produce a time-domain echo, subtracting the time-domain echo from a time-domain receive block of a received signal, converting the resulting signal to the frequency-domain to produce a frequency-domain receive block, subtracting the frequency-domain echo from the frequency-domain receive block to produce an echo-free receive block, updating the frequency-domain echo parameters by comparing the echo-free receive block to the frequency-domain transmit block, infrequently updating the time-domain echo parameters by converting the frequency-domain echo parameters to the time-domain, and repeating the repeating steps for each block of the received signal.

3 Claims, 8 Drawing Sheets

Full Duplex Data Transmission in a Telephone Network

METHOD AND APPARATUS FOR ECHO CANCELLATION WITH DISCRETE MULTITONE MODULATION

BACKGROUND OF THE INVENTION

1. Field of the Invention

This invention relates generally to data communication systems and more specifically to an improved echo cancellation method and apparatus for use in high speed full-duplex data transceiver systems which combines frequency-domain and time-domain echo emulation and frequency-domain adaptive updating.

2. Brief Description of the Prior Art

Full-duplex data transmission is the transmission of data in opposite directions simultaneously over overlapping frequency bands. Echo is the undesired leakage of a transmitted signal into the co-located receiver, superimposed upon and thus interfering with the intended transmission. As an example, in a telephone network, one type of echo occurs when a customer's transmitted signal leaks through the hybrid circuit back into that customer's receiver, interfering with the transmitted signal from another customer.

In the example shown in FIG. 1, the hybrid connector is the 'echo channel' whose operation can be modelled by a finite set of parameters derived by sampling the echo channel response. An echo canceller operates by first estimating the echo parameters, and then linearly convolving the estimate with the transmitted data, thus emulating the echo. This emulated echo is then subtracted from the received signal, which ideally results in an echo-free transmission.

Echo occurs primarily because of mismatched impedances at the hybrid connectors. Because the impedances of the transmission lines are time-varying as well as line-dependent, the echo canceller must be adaptive—it must learn the echo characteristics and track time-varying changes. The echo canceller can be made adaptive as follows: After estimating the echo parameters, emulating the echo, and subtracting it from the received signal, the remaining signal (which contains some residual echo) is fed back and used to update the estimated set of echo parameters. This feedback loop allows the echo canceller to converge to a close approximation of the echo parameters. A basic tutorial on echo cancellation can be found in *Digital Communications*, E.A. Lee and D.G. Messerschmitt, Kluwer, Boston, 1988.

Echo cancellation may be accomplished either in the time-domain or in the frequency-domain. In time-domain echo cancellation, echo parameters are derived by sampling the echo channel response, and echo emulation involves a complex time-domain convolution. In frequency-domain echo cancellation, the echo parameters are obtained by sampling the spectrum of the echo channel rather than sampling the echo channel response. Echo emulation and adaptive update can then take place in the frequency-domain, using the estimate of the spectrum of the echo channel.

Multicarrier modulation is a means of transmitting data by first grouping the binary digital data to be transmitted into sub-blocks. The sub-blocks are then further grouped into fixed-length blocks. As an example, each sub-block may contain one to eight bits, and 100 sub-blocks will form a block. For analog transmission across the communication channel, a set of carrier signals is used whose frequencies lie at evenly spaced values across the usable frequency band. This set of carrier signals is equal in number to the number of sub-blocks within a block. Continuing the above example, with a sampling frequency of 1.0 MHz, 100 carrier signals would be used at multiples of 10 kHz. The bits within each sub-block are then used to modulate the corresponding carrier signal. The set of modulated carriers are then added together, and the resultant signal is transmitted across the channel. Multicarrier modulation is described more fully in "Multicarrier Modulation for Data Transmission: An Idea whose Time Has Come", J.A.C. Bingham, *IEEE Communications Magazine*, 28(5):5–14, May 1990.

Discrete Multitone Modulation (DMT) is a form of multicarrier modulation that is implemented with digital signal processing, where an IFFT/FFT pair are used as modulation/demodulation vectors. DMT is discussed in detail in "Discrete Multiple Tone Modulation with Coset Coding for the Spectrally Shaped Channel", A. Ruiz, J.M. Cioffi, and S. Kasturia, *IEEE Transactions on Communications*, 40:1012–29, June 1992.

Digital communication systems rely upon four basic time and frequency-domain relationships that can be found in any basic digital signal processing text, such as *Discrete-Time Signal Processing*, A.V. Oppenheim and R.W. Schafer, Prentice-Hall, Englewood Cliffs, NJ, 1989. These relationships are enumerated below:

1. Cyclic convolution: The cyclic convolution of two equally-sized time-domain sequences is equivalent to the block multiply of their FFT's.

2. Interpolation: Padding a discrete sequence with k zeros between each sample is equivalent to replicating the FFT of the sequence k times.

3. Decimation: If the copies of the spectra of a discrete sequence are spaced by multiples of 1 Mhz, downsampling the discrete sequence by 10 spaces the spectra by multiples of 100 Khz. If the spectrum bandwidth is greater than 100 kHz, then aliasing occurs.

4. Time-delay: Time delay in the time domain is equivalent to exponential weighting in the frequency domain.

In general an echo channel is formed by multiplying together the responses of the DAC, the transmit filter, the hybrid, the anti-aliasing filter, and the ADC, as explained in *Discrete-Time Signal Processing*, A.V. Oppenheim and R.W. Schafer, Prentice-Hall, Englewood Cliffs, NJ, 1989. These five operations and some of their ramifications for echo cancellation are described below.

The DAC converts the sequence x(n) to an impulse train multiplied by a continuous time function x(t), and convolves this with the impulse response of a zero-order hold (ZOH). In the frequency-domain, this corresponds to replicating the spectrum of X(f) at multiples of the sampling rate 1/T (denoted as $X_p(f)$), multiplied by one copy of a sinc function.

Ideally, the transmit, or reconstruction filter, T(f), should cut off at around $\frac{1}{2}T$. Otherwise, there are frequency components outside this bandwidth, and the echo canceller must cancel these components as well. We denote the hybrid frequency-domain response by H(f). The anti-aliasing filter, A(f), ideally cuts off at $\frac{1}{2}T'$.

The ADC is a sample and hold, so that the spectra are now replicated at multiples of the sampling rate 1/T', and multiplied by a sinc. If the anti-aliasing filter is not ideal, then aliasing occurs, and these effects must be modelled by the echo canceller.

The effective echo channel impulse response is the frequency-domain product of these five responses:

$$H_o(f) = X_p(f)T(f)H(f)A(f)\mathrm{sinc}^2(f)$$

When T>T', the width of A(f) exceeds the width of T(f), so the effects of T(f) dominate, and out-of-band noise is a consideration. When T'>T, the width of T(f) exceeds the width of A(f), so the effects of A(f) dominate, and aliasing is a consideration.

As explained in "Asynchronous and Timing Jitter Insensitive Data Echo Cancellation", D.G. Messerschmitt, *IEEE Transactions on Communications*, 34:1209–1217, December 1986, the timing signal on the customer end is derived from the received signal by means of a timing recovery circuit, and is used by both the analog-to-digital converter (ADC) for sampling the output of the hybrid as well as the transmitter for clocking the transmit data symbols. Timing jitter is phase jitter in the timing signal, and can significantly degrade performance of the echo canceller. However, timing jitter can be thought of as a delay in time, and a delayed block of time-domain symbols corresponds to a frequency-domain multiplication of the FFT of the non-delayed block of data symbols with a linear phase filter. Therefore, timing-phase jitter can be compensated for by a frequency-domain block multiplication of the jittered block with the settings of the inverse of the linear phase filter, leaving the unjittered block.

Most existing echo cancellers use the tapped-delay line structure (also known as an FIR filter) to model the echo channel and replicate the echo. However, at high data rates, the FIR filter can be several hundred taps long, and the computational complexity is high. Our invention avoids this complexity by performing the bulk of echo emulation in the frequency-domain.

Previous work on echo cancellation with multicarrier modulation has been done by J. Yang, S. Roy, and N.H. Lewis in "Data Driven Echo Cancellation for A Multi-Tone Modulation System", to appear in *IEEE Transactions on Communications*, 1992. This work contains three time-domain filters for each subchannel.

Previous work has also been done by J.M. Cioffi and J. Bingham in "A Data-Driven Multitone Echo Cancellor", *Globecom* '91, pages 57–61, Phoenix, Ariz., January 1991. This work contains two echo cancellers: a computationally expensive signal-driven time-domain echo canceller and an adaptive data-driven frequency-domain echo canceller. The time-domain echo canceller is significantly more complex than that in the present invention. Furthermore, Cioffi and Bingham's work contains neither the present invention's timing jitter correction, nor the present invention's applicability to asymmetric data transmission.

The standard mathematical model for echo generation is a discrete-time linear convolution of a portion of the previous data symbol concatenated with the current data symbol and the echo finite impulse response (FIR) taps (FIG. 2(a)). It is assumed that the echo response has been sampled at twice the Nyquist rate. However, the same results can be achieved with the sum of a cyclic convolution, depicted by an "X", and a linear convolution, depicted by an "*" (FIG. 2(b)). Note that the larger the cyclic prefix, the smaller the two data sequences for the linear convolution. Combining a cyclic convolution with a linear convolution has the advantage that the cyclic convolution can be performed faster in the frequency-domain with a block multiply. The short linear convolution is performed in the time-domain.

SUMMARY OF THE INVENTION

It is therefore a primary objective of the present invention to provide an improved echo canceller that accurately estimates and eliminates unwanted echo present in full-duplex data communication channels.

Another objective of the present invention is to provide an improved echo canceller of the type described having features and performance sufficient to accommodate high speed data communication.

Another objective of the present invention is to provide an improved echo canceller of the type described that adaptively corrects for time-varying changes in the characteristics of the echo channel.

Another objective of the present invention is to provide an improved echo canceller of the type described that does not require continuous high-complexity computations.

Another objective of the present invention is to provide an improved echo canceller of the type described that recognizes and eliminates timing phase jitter without significantly degrading performance.

Briefly, a preferred embodiment of the present invention implements a method of cancelling unwanted echo leakage from a transmitted signal to a received signal in a full-duplex data communication system with discrete multitone modulation, comprised of an initial step of initializing a set of frequency-domain echo parameters and a set of corresponding time-domain echo parameters, and further including the repeating steps of block multiplying a frequency-domain transmit block of a transmitted signal by the set of frequency-domain echo parameters to produce a frequency-domain echo, converting the frequency-domain transmit block to a time-domain transmit block, subtracting the end of the previous time-domain transmit block from the end of the current time-domain transmit block, performing a convolution of the adjusted time-domain transmit block and the time-domain echo parameters to produce a time-domain echo, subtracting the time-domain echo from a time-domain receive block of a received signal, converting the resulting signal to the frequency-domain to produce a frequency-domain receive block, subtracting the frequency-domain echo from the frequency-domain receive block to produce an echo-free receive block, updating the frequency-domain echo parameters by comparing the echo-free receive block to the frequency-domain transmit block, infrequently updating the time-domain echo parameters by converting the frequency-domain echo parameters to the time-domain, and repeating the repeating steps for each block of the received signal.

Among the advantages of the present invention is that the computational complexity is significantly less than prior art methods, especially at high data rates.

Another advantage of the present invention is that it adaptively corrects, in real-time, for variations in the echo channel.

These and other objects and advantages of the present invention will no doubt become apparent to those skilled in the art after having read the following detailed description of the preferred embodiment which is contained in and illustrated by the various drawing figures.

IN THE DRAWINGS

DETAILED DESCRIPTION OF THE PREFERRED EMBODIMENT

Figure 3:
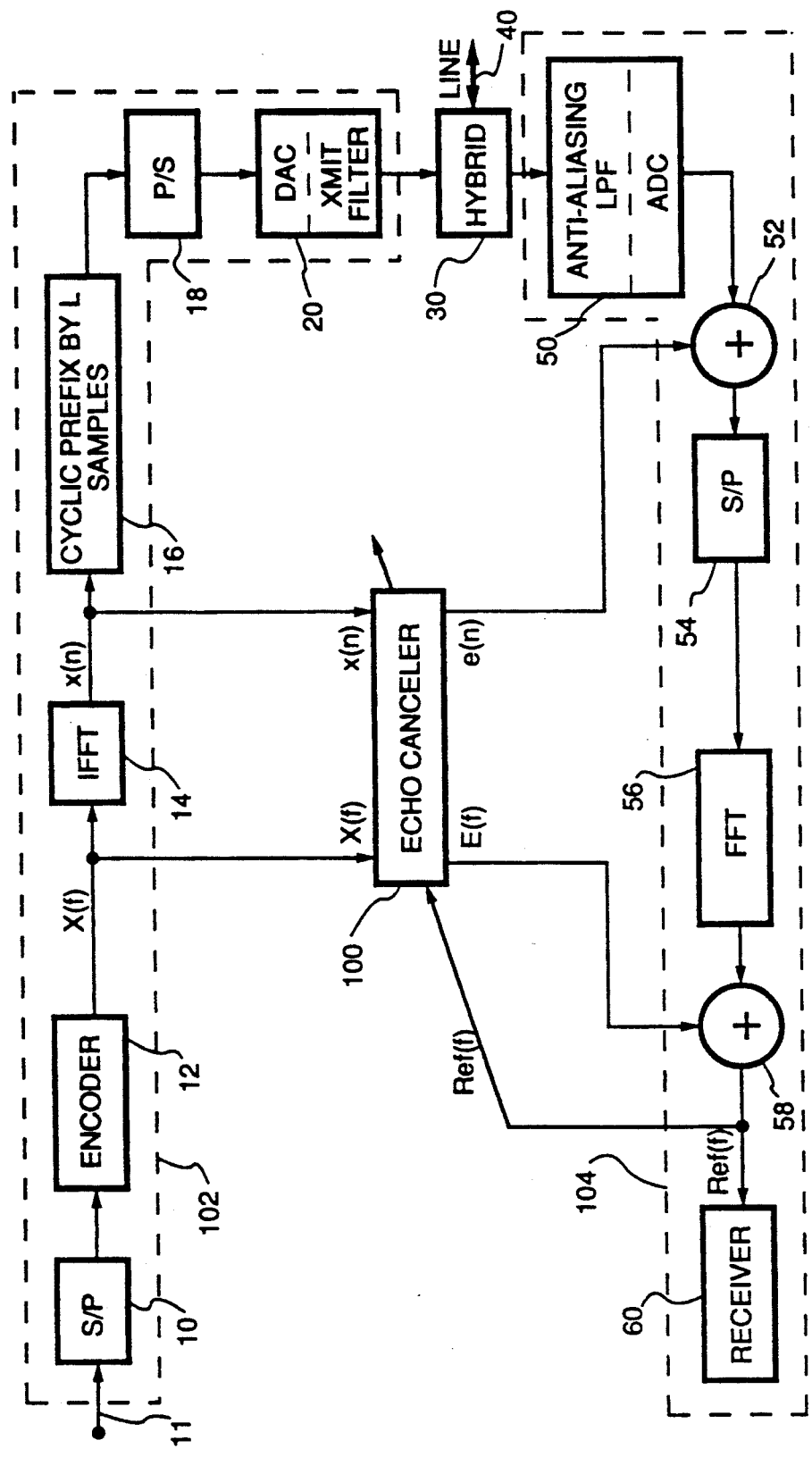
FIG. 3 is a block diagram of a multicarrier transceiver system including an improved echo canceller in accordance with the present invention.

Referring to FIG. 3 of the drawing, a multicarrier transceiver system is depicted, including an echo canceller 100 in accordance with the present invention. This figure is included for clarity to explain the operation of the transmit portion 102 and receive portion 104 of the multicarrier transceiver system, and to show how an echo canceller in accordance with the present invention fits into such a system.

Data is transmitted on a block-by-block basis. While one block is clocked serially to the line, another is readied for transmission. The steps for generating one block of data are summarized as follows:

The serial-to-parallel (S/P) converter 10, in conjunction with the encoder 12, converts a stream of binary data input at 11 into N sub-blocks, each of which comprises a variable number of binary bits. The encoder 12 then converts the binary data in each sub-block into a two-dimensional vector of integers. This can be considered to be a vector of complex integers, where one dimension can be taken as the real part and the other as the imaginary part. The resultant signal X(f) is then an N×1 vector whose elements are complex integers.

Each of the N complex integers is modulated by N carriers at evenly spaced frequencies, using an IFFT 14 that converts the block of N "frequency-domain" complex values X(f) into a block of N real, "time-domain" samples x(n).

The Cyclic Prefix block 16 copies the last L samples of the N×1 real vector, called the cyclic prefix, and prepends them to the beginning of the block, in order to eliminate inter-block interference in the far-end receiver. The resultant (N+L)×1 vector is the signal to be transmitted.

The (N+L)×1 vector is converted by a parallel-to-serial converter (P/S) 18 into a sequence of time-domain signals which are then passed successively through a digital-to-analog converter (DAC) and transmit filter 20, a hybrid line interface 30, and then to the line 40. This concludes the transmit process.

The echo canceller 100 receives a frequency-domain transmit block X(f), a time-domain transmit block x(n), and an echo-free receive block $R_{ef}(f)$, and processes these inputs to emulate and produce an echo component of the transmitted signal which leaks to the received signal. The emulated signal includes a time-domain echo e(n) part and a frequency-domain echo E(f) part.

The received signal comprises the far-end transmission plus noise, as well as echo leakage from the near-end transmitter. It is processed as follows:

The time-domain signal received from the line 40 is passed through a low-pass anti-aliasing filter an analog-to-digital converter (ADC) 50.

After the adder 52 subtracts the time-domain portion of the echo, e(n), the output is converted by a serial-to-parallel (S/P) converter 54 into a block of N real-valued time-domain samples.

The resultant signal is then passed through an FFT 56 to produce a block of N complex-valued "frequency-domain" samples.

The frequency-domain portion of the echo E(f) is then subtracted by adder 58, to produce an (ideally) echo-free receive block $R_{ef}(f)$. The echo-free receive block is then passed to the rest of the receiver 60, as well as being returned to the echo canceller 100 for adaptive purposes.

It will be recognized that many variants of this basic multicarrier transceiver are possible, and that the above description is included only by way of example.

Figure 4:
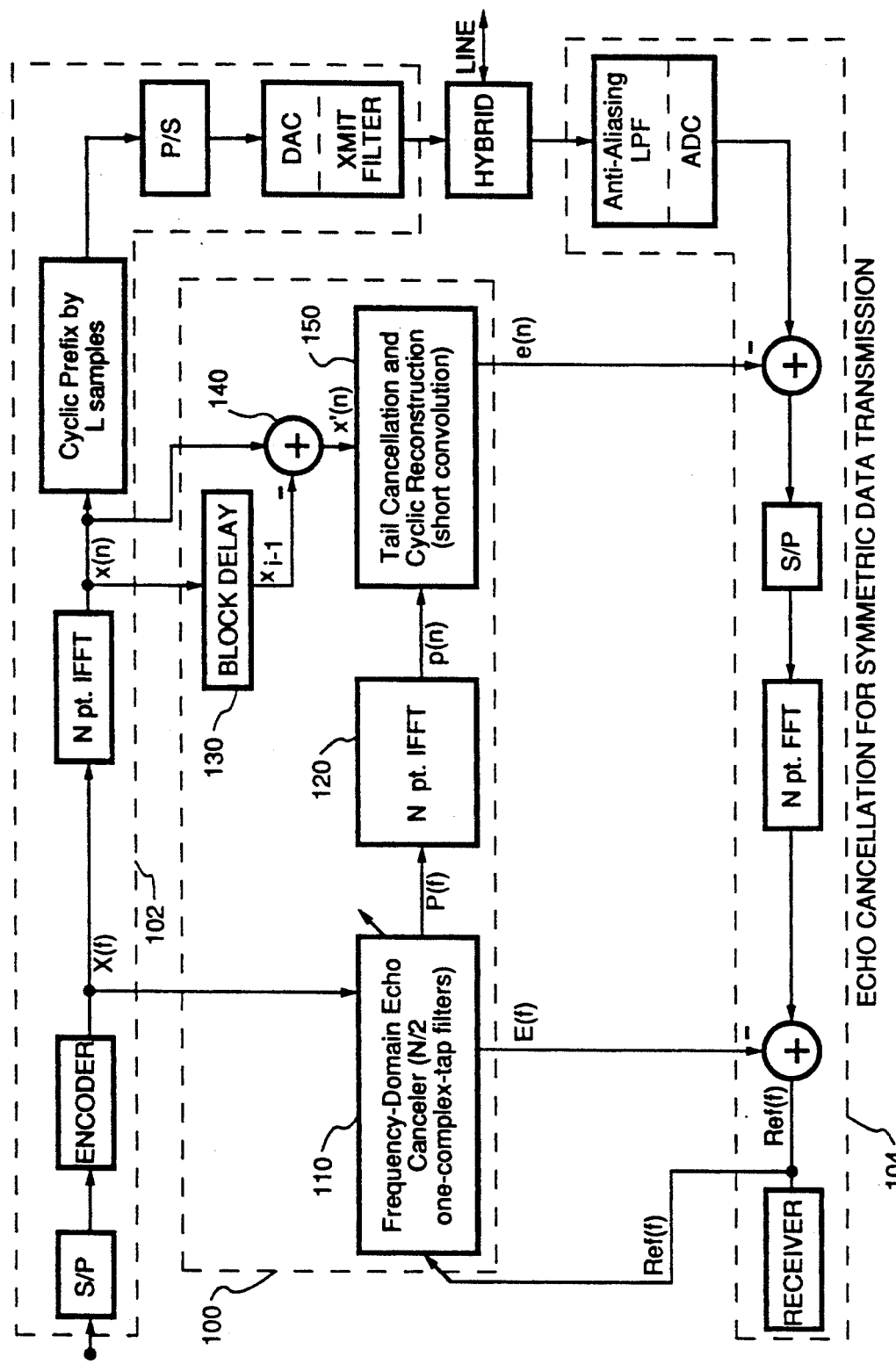
FIG. 4 is a block diagram of a preferred embodiment of the present invention for symmetric data transmission.

Referring now to FIG. 4, a multicarrier transceiver system is depicted, including at 100 a more detailed block diagram of an echo canceller in accordance with the present invention. The preferred embodiment includes a Frequency-Domain Echo Canceller 110, an N-point Inverse Fast Fourier Transform (IFFT) 120, a Block Delay 130, an adder 140, and a Tail Cancellation and Cyclic Reconstruction block 150.

Upon start-up, both the Frequency-Domain Echo Canceller 110 and the Tail Cancellation and Cyclic Reconstruction block 150 have internal sets of stored parameters which must be initialized. The Frequency-Domain Echo Canceller 110 stores a set of N frequency-domain echo parameters P(f), which are initially estimated by means of a fast start up technique which hastens convergence, as described in "A Fast Echo Canceller Initialization Method for the CCITT V32 Modem", Cioffi, J.M., *Globecom '87*, Tokyo, November 1987. The Tail Cancellation and Cyclic Reconstruction block 150 stores a set of M (where M is the length of the echo channel impulse response) time-domain echo parameters p(n), which are initialized by performing IFFT (box 120) on the initial frequency-domain echo parameters P(f).

In operation, the Frequency-Domain Echo Canceller 110 receives the echo-free receive block $R_{ef}(f)$ from the previous cycle, which it uses to update the set of N frequency-domain echo parameters P(f). The echo parameters P(f) are adaptively updated using the LMS algorithm in the frequency-domain. The frequency-domain LMS is well-known, and is described in "Unconstrained Frequency-Domain Adaptive Filter", Mansour, D. and Gray, A.H.,Jr., *IEEE Transactions on ASSP*, 30(5):726–734, October 1982. At time i, each frequency-domain complex-valued echo parameter $P_i(f)$ is updated as follows:

$$P_{i+1}(f) = P_i(f) + \mu^* R_{ef}(f)^* X^*(f)$$

where $X^*(f)$ is the conjugate of a sample of the transmit block X(f).

The invention further includes the property that if the cyclic prefix length, L, equals or exceeds the length of the echo channel impulse response, M, then each of the frequency-domain echo parameters acts as a one-tap LMS adaptive filter, independent of each of the other echo parameters, to provide best performance.

This set of echo parameters P(f) is then block-multiplied by the frequency-domain transmit block X(f) to produce a frequency-domain echo E(f). In addition, the echo parameters P(f) are infrequently output to the IFFT 120.

The IFFT 120 infrequently receives the N frequency-domain echo parameters P(f) and converts them to a set of M time-domain echo parameters p(n), which are then output to the Tail Cancellation and Cyclic reconstruction block 150.

The Block Delay 130 receives and stores the time-domain transmit block x(n), and then outputs it as $x_{i-1}(n)$ to the adder 140 during the next cycle. The adder 140 then subtracts the end of the previous block from the end of the current block as follows: Of the N samples that form x(n) and $x_{i-1}(n)$, the adder 140 aligns and subtracts the samples $x_{i-1}(n)$, n=N−M+L+2... N, from the corresponding samples of x(n). The resulting samples, x'(n), are output to the Tail Cancellation and Cyclic Reconstruction circuit 150.

Figure 1:
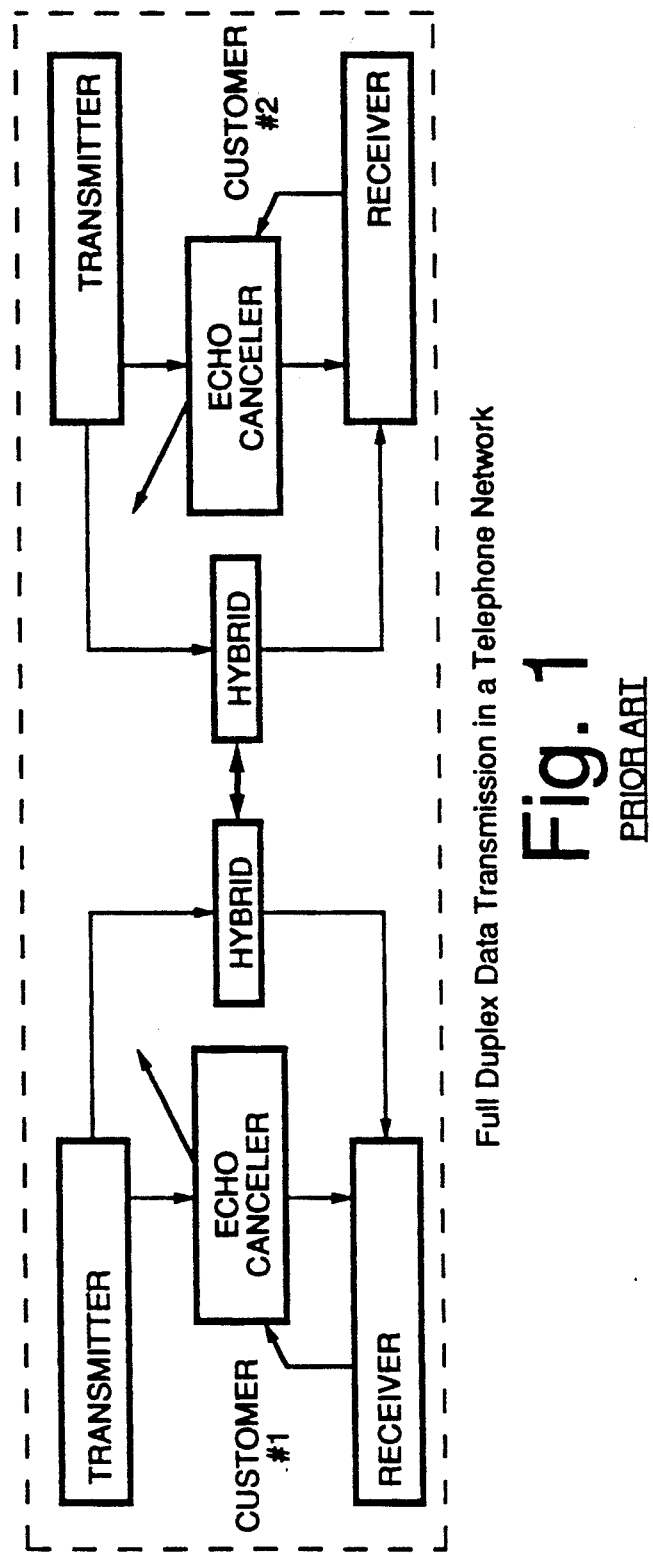
FIG. 1 is a block diagram depicting echo cancellers in a generalized prior art full-duplex telephone network.
Figure 2A:
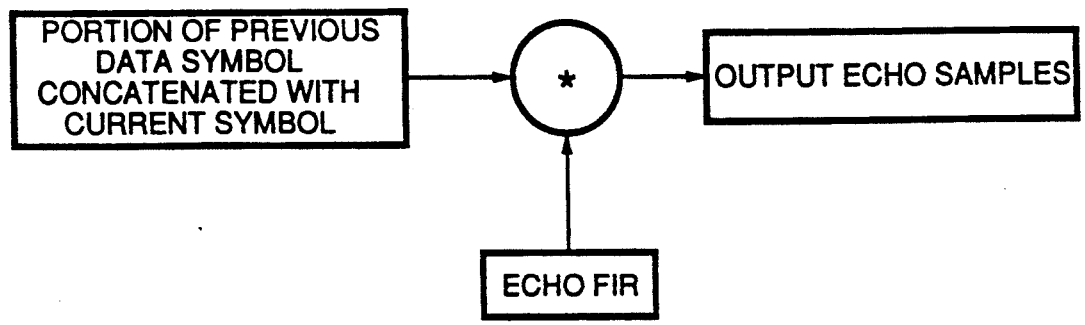
FIG. 2(a) is a block diagram depicting the standard mathematical model for echo emulation.
Figure 2B:
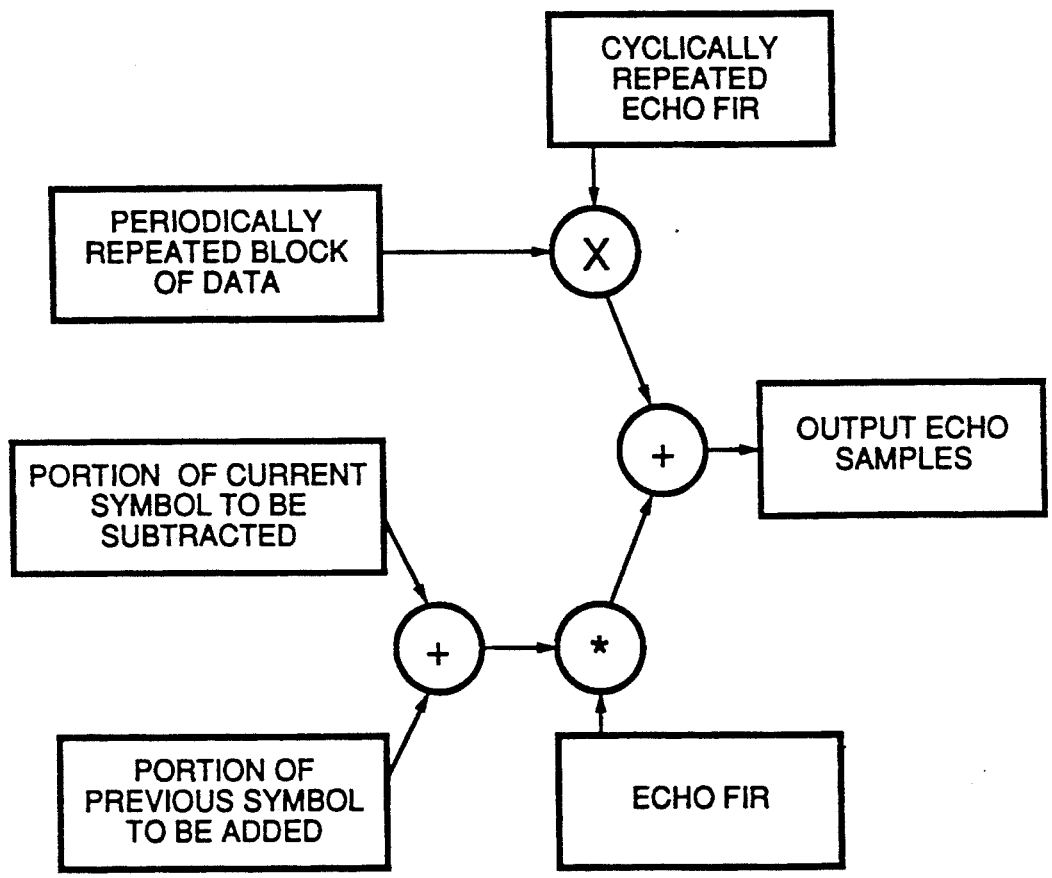
FIG. 2(b) is a block diagram depicting an improved mathematical model for echo emulation in accordance with the present invention.

The Tail Cancellation and Cyclic Reconstruction circuit 150 is a short time-domain linear convolution of 2 sequences, p(n) and x'(n). One of the sequences, p(n), is the set of M time-domain echo parameters p(n). The other sequence, x'(n), is formed by subtracting the end of the previous block (the tail) from the end of the current transmit block (the cyclic data). Subtracting these two short blocks and convolving the result with the echo parameters is equivalent to subtracting the convolution of the tail and the echo parameters (tail cancellation) from the convolution of the cyclic data and the echo parameters (cyclic reconstruction). When added to the cyclic convolution (the block multiply in the Frequency-Domain Echo Canceller 110), the combined functionality should be equivalent to a long linear convolution. This equivalence is shown in FIGS. 2(a) and 2(b). The result of the linear convolution is output as time-domain echo e(n). The time-domain echo parameters p(n) are infrequently updated (less than once per cycle) from the output of IFFT 120.

The preferred embodiment described above is optimized for applications involving symmetric data transmission, where data is being transmitted and received at the same rate.

For applications involving asymmetric data transmission, alternate embodiments of the present invention are preferred. In such cases, the receiver FFT is of a different size than the transmitter IFFT. Echo cancellation uses transmitted symbols (blocks) to cancel the echo in the received symbols. Since the symbols are of different lengths, it is necessary to decimate or interpolate according to whether the transmit symbol is longer or smaller than the received symbol. We denote downstream asymmetric data transmission to be the case where the size of the IFFT is k times that of the FFT, and we denote upstream asymmetric data transmission to be the case when the size of the FFT is k times that of the IFFT.

Figure 5:
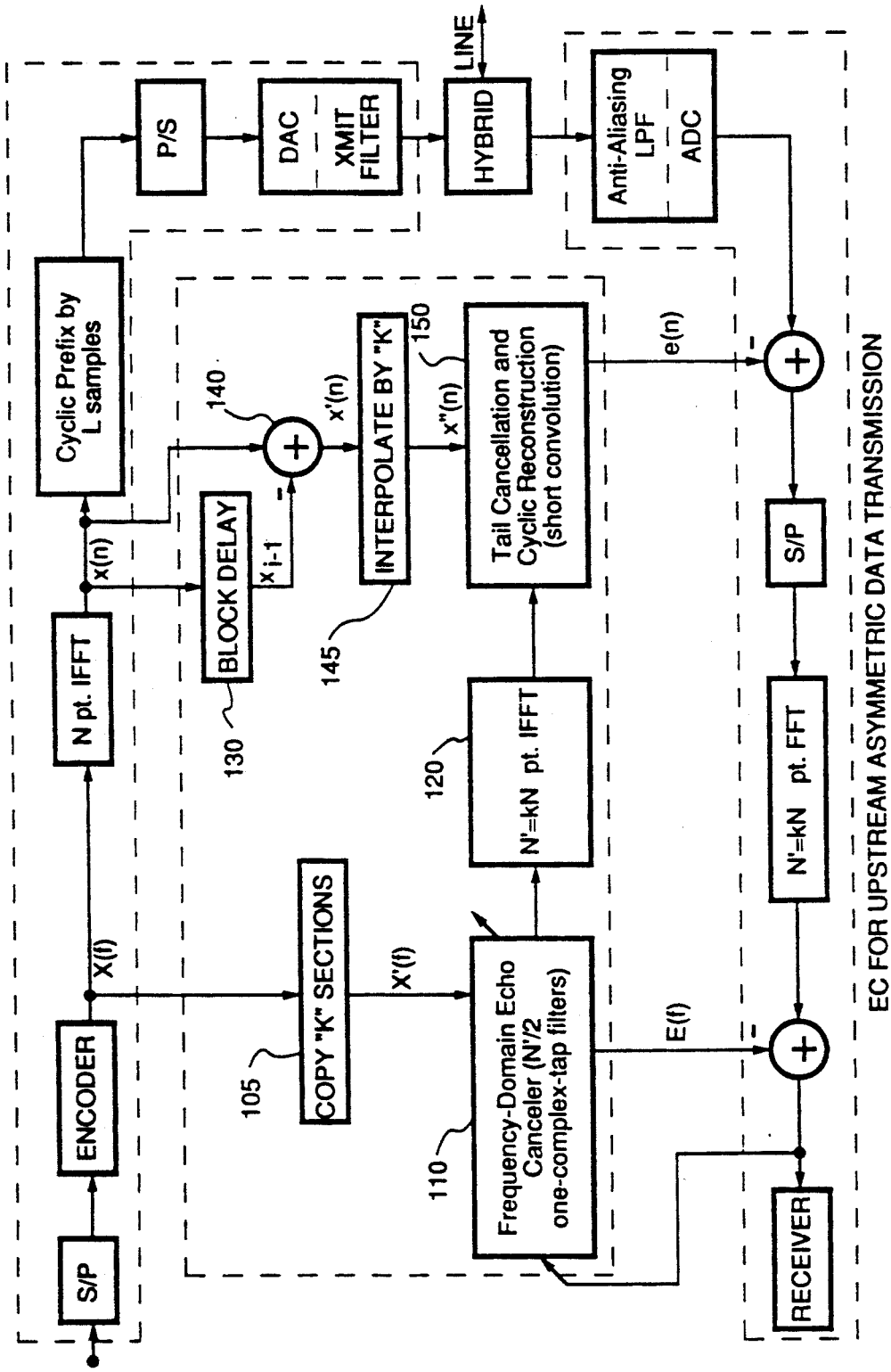
FIG. 5 is a block diagram of an alternate embodiment of the present invention for upstream asymmetric data transmission.

Referring now to FIG. 5, an alternate embodiment of the present invention is depicted for upstream asymmetric data transmission. Here, the receiver FFT is k times the size of the transmitter IFFT. For the Frequency-Domain Echo Canceller 110, this means that we must replicate the frequency-domain transmit block X(f) spectra k times, to form k contiguous blocks. Thus, the Copy circuit 105 receives X(f), which has N data samples, and produces X'(f), which contains k contiguous copies of X(f), or kN data samples spanning a frequency band k times wider than that spanned by X(f).

In the time-domain, we must perform the equivalent operation to frequency-domain replication: we must zero-pad the time-domain transmit block x'(n) with k−1 zeroes between each sample, so that the resulting block has kN time-domain samples. Thus, if x'(n) is represented by $$x' = [x_1, x_2, \ldots x_N].$$

Then x''(n), the interpolated transmit block, is formed by padding x' with k zeros between each of the samples. In other words, $$x'' = [x_1, 0, \ldots 0, x_2, 0, \ldots 0, \ldots x_{N-1}, 0, \ldots 0, x_N, 0, \ldots 0]$$

and x''(n) is formed of kN time-domain data samples. The Interpolate circuit 145 performs this operation, receiving x'(n) from the adder and zero-padding it to produce x''(n), which is generated as the input to the Tail Cancellation and Cyclic Reconstruction circuit 150.

Figure 6:
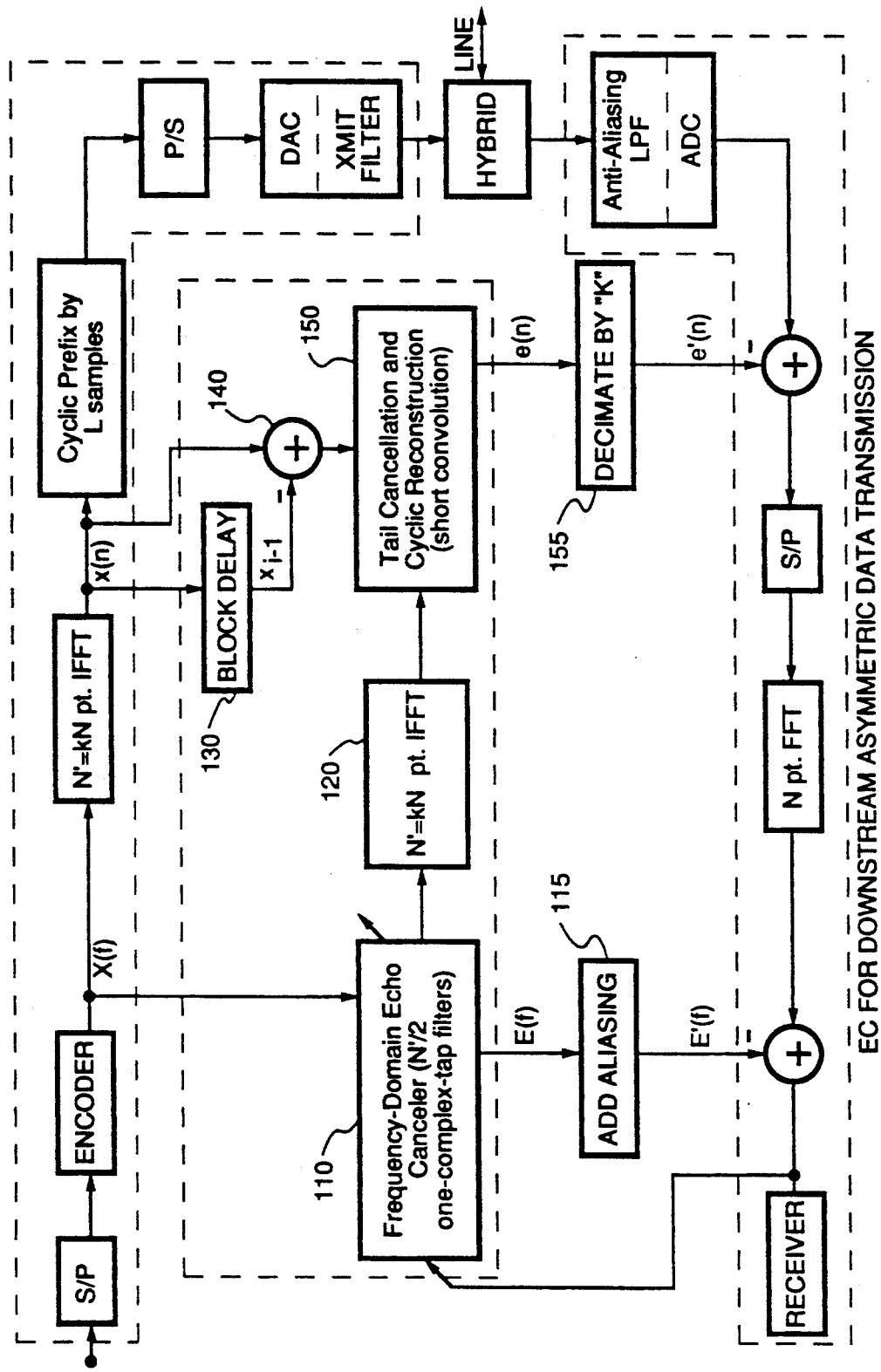
FIG. 6 is a block diagram of an alternate embodiment of the present invention for downstream asymmetric data transmission.

Referring now to FIG. 6, an alternate embodiment of the present invention is depicted for downstream asymmetric data transmission. Here, the transmitter IFFT is k times the size of the receiver FFT. For the Frequency-Domain Echo Canceller 110, this means that the kN frequency-domain data samples must be reduced to N samples.

E(f) denotes the output of the frequency-domain echo canceller 110. E(f) is a block of kN complex frequency-domain data samples, and we divide E into k contiguous blocks of N points each. In other words, $$E = [E_1, E_2, \ldots E_k]$$

Indexing each sub-block $E_i$ by $[E_{i,1}, E_{i,2}, \ldots E_{i,N}]$, we form E'(f) by adding all the points indexed one together to form the first point, $$E'_1 = E_{1,1} + E_{2,1} + \ldots + E_{k,1}$$

and so forth for each of the N samples that form E'(f). This process is performed by the Aliasing circuit 115, which receives E(f) and performs the above summations to produce E'(f).

In the time-domain, we must perform the equivalent operation to frequency-domain aliasing: we must decimate the time-domain echo e(n) by sampling only every $k^{th}$ point of e(n) to produce e'(n) This is done by the Decimate circuit 155, which receives e(n) and decimates it by k to produce e'(n).

Figure 7:
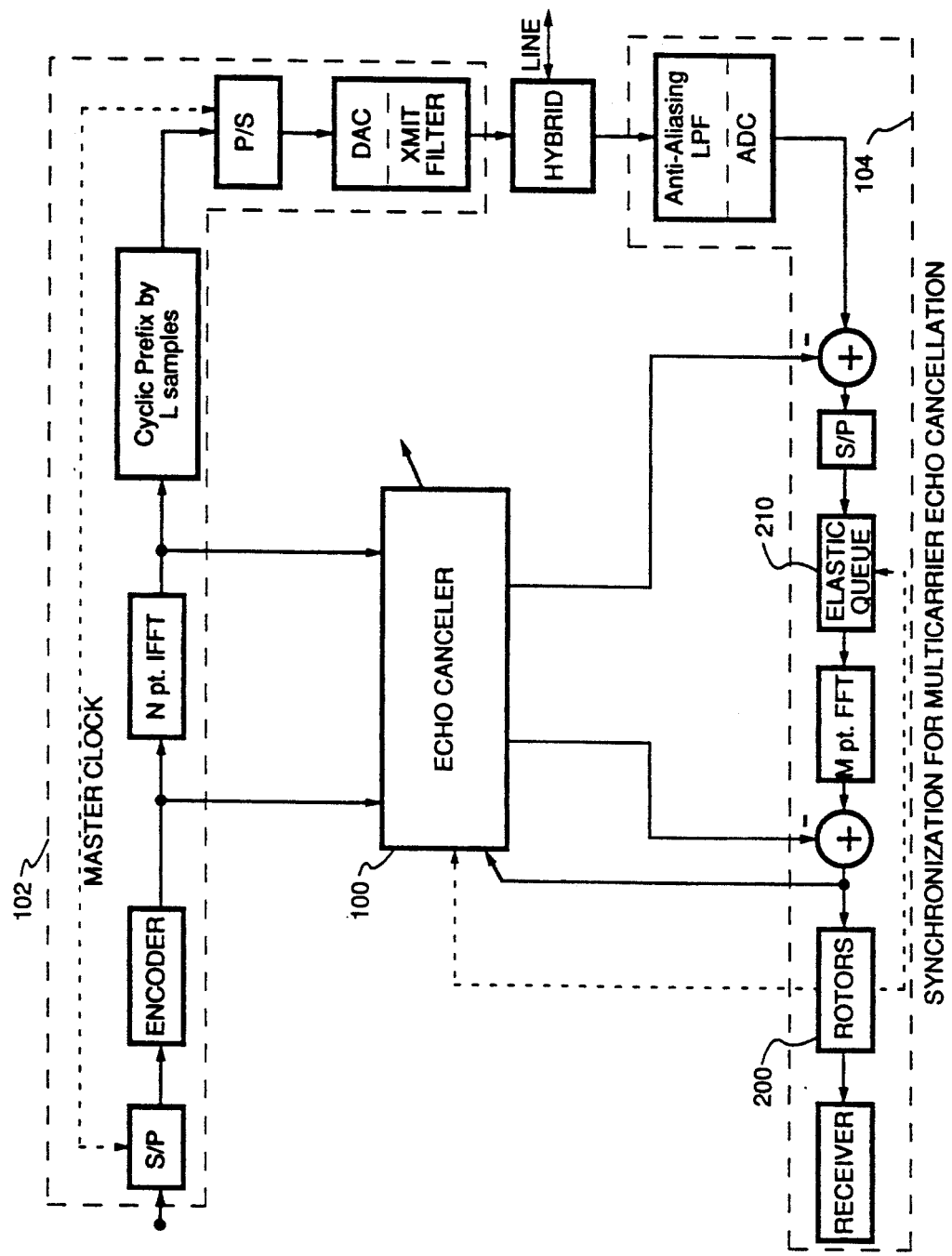
FIG. 7 is a block diagram depicting a further improvement of the present invention which eliminates timing jitter.

Referring now to FIG. 7, a further improvement of the present invention is depicted, which is directed to eliminating timing phase jitter with respect to a remote transmitter clock. Although only the near-end transmit clock is necessary to cancel echo, it is necessary to recover the clock used by the far-end transmitter in order to convert the received signal into the correct data symbols. This derived timing usually has timing jitter with respect to the far-end transmit clock. In the time-domain, this jitter translates into an average time-delay over a received symbol. In the frequency-domain, this translates into weighting the symbol with a block of exponentials. This operation is performed on the echo-free received block $R_{ef}$ by the Rotors 200.

When the phase difference becomes greater than a period, then a cycle slip occurs. Depending on whether a positive or a negative cycle slip has occurred, it is necessary to either "rob" (delete) or "stuff" (add) a sample to re-align the clocks. This operation is performed by the elastic queue 210, which is a buffer that can vary in size to encompass one more sample of one fewer sample. The elastic queue 210 buffers the serial stream for demodulation by the FFT. It should be noted that the time-domain part of the echo has been cancelled prior to the robbing/stuffing operation, but that the frequency-domain part of the echo is cancelled afterwards. Therefore, to compensate for the sample robbing or stuffing, it is also necessary to weight the frequency-domain parameters in the echo canceller with a block of exponentials. The dotted lines in the figure depict timing signal lines which communicate the timing of robbing or stuffing and frequency-domain exponential weighting between the Elastic Queue 210, the Rotors 200 and the Echo Canceller 100.

Figure 8:
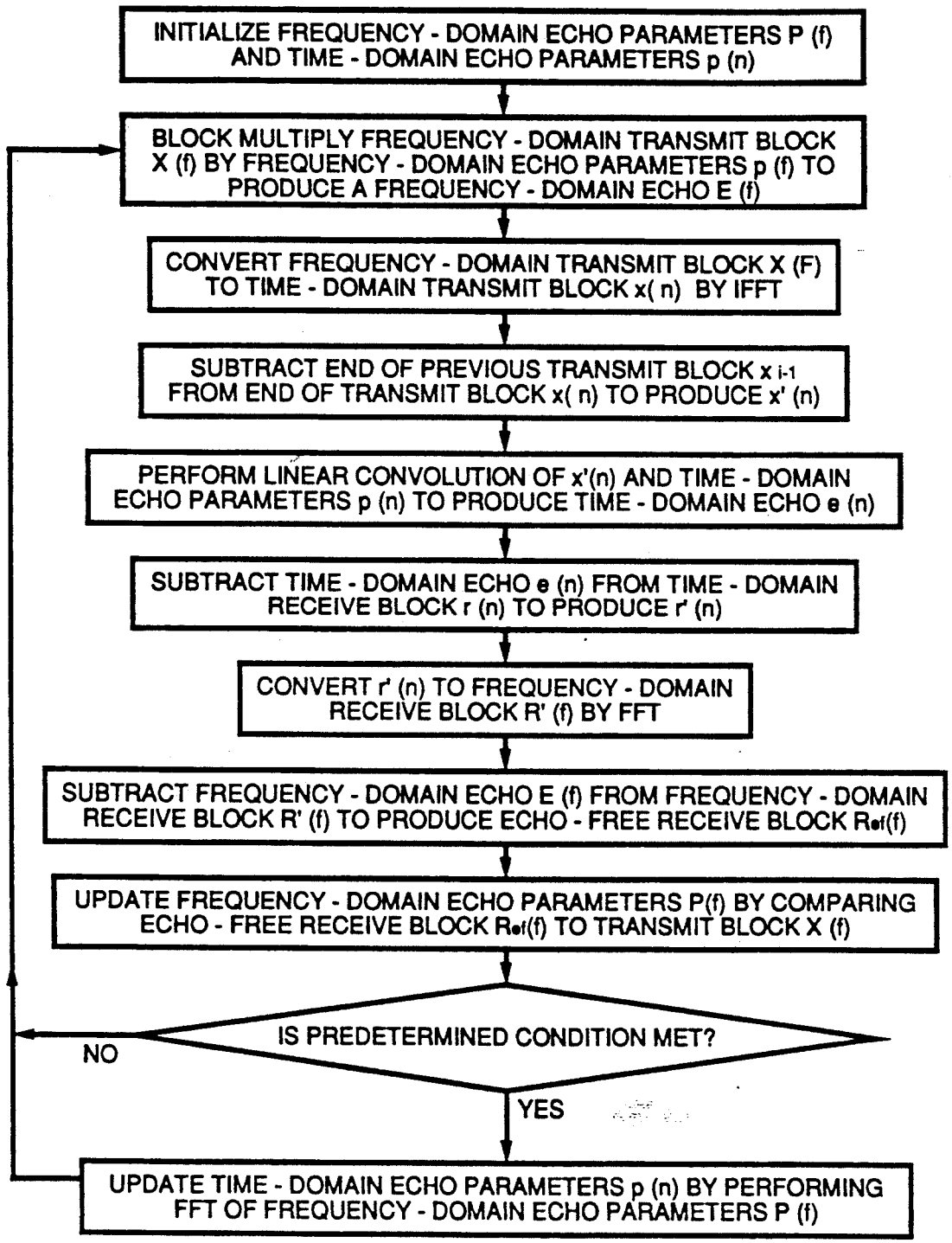
FIG. 8 is a flowchart depicting the various steps of a method in accordance with the present invention.

From the above functional description of the apparatus of the present invention, it should be clear that the present invention also includes a method of cancelling echo in a multicarrier transceiver system. Referring now to FIG. 8 of the drawing, a flowchart of this method is depicted. As shown, this method comprises the steps of generating initial values for a set of frequency-domain echo parameters P(f) and a set of corresponding time-domain echo parameters p(n), and then performing the following repeating steps: block multiplying a frequency-domain transmit block X(f) by the set of frequency-domain echo parameters P(f) to produce a frequency-domain echo E(f), converting the frequency-domain transmit block X(f) to a time-domain transmit block x(n) by means of an IFFT, subtracting the end of the previous time-domain transmit block $x_{i-1}$ from the end of the time-domain transmit block x(n) to produce a adjusted transmit block x'(n), performing a linear convolution of the adjusted transmit block x' and the time-domain echo parameters p(n) to produce a time-domain echo e(n), subtracting the time-domain echo e(n) from a time-domain receive block r(n) to produce r'(n), converting r'(n) to the frequency-domain by means of an FFT to produce a frequency-domain receive block R'(f), subtracting the frequency-domain echo E(f) from the frequency-domain receive block R'(f) to produce an echo-free receive block $R_{ef}$(f), updating the frequency-domain echo parameters P(f) by comparing the echo-free receive block $R_{ef}$(f) to the frequency-domain transmit block X(f), if a predetermined condition is met, update the time-domain echo parameters e(n) by converting the frequency-domain echo parameters E(f) to the time-domain by means of an IFFT, and repeating the steps (except for the initialization) for each received block.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A multicarrier transceiver system, comprising;

a multicarrier transmitter, responsive to input data, and operative to generate a frequency-domain transmit signal X(f), a time-domain transmit signal x(n) and an output transmit signal for communication to a remote receiver through a data link;

a multicarrier receiver, responsive to an input receive signal received from a remote transmitter through said data link, a time-domain echo signal e(n), and a frequency-domain echo signal E(f), and operative to generate an error-free receive signal $R_{ef}$(f) and output data; and an echo canceller, responsive to said frequency-domain transmit signal X(f) and said time-domain transmit signal x(n), and adaptively responsive to said error-free received signal $R_{ef}$(f) and operative to generate an echo component of said output transmit signal appearing in said input receive signal including said time-domain echo signal e(n) and said frequency-domain echo signal E(f) for input to said receiver.

2. A multicarrier transceiver system as recited in claim 1, wherein said echo canceller includes;

a frequency-domain echo canceller subsystem responsive to said frequency-domain transmit signal X(f) and said echo-free receive signal $R_{ef}$(f), and operative to generate a set of frequency-domain echo parameters P(f) and said frequency-domain echo signal E(f);

an IFFT subsystem responsive to said frequency-domain echo parameters p(f) and operative to generate a set of time-domain echo parameters p(n);

a block delay subsystem responsive to said time-domain transmit signal x(n) and operative to store said time-domain transmit signal for one cycle and generate a previous time-domain transmit signal $x_{i-1}$;

an adder subsystem responsive to said time-domain transmit signal x(n) and said previous time-domain transmit signal $x_{i-1}$ operative to subtract said previous time-domain transmit signal $x_{i-1}$ from said time-domain transmit signal x(n), and to generate the result X'(n) of the subtraction;

a tail cancellation and cyclic reconstruction subsystem responsive to the result x'(n) of the subtraction and the time-domain echo parameters p(n) and operative to perform a linear convolution of the result x'(n) and the parameters p(n) to produce said time-domain echo signal e(n).

3. A method of cancelling echo in a multicarrier transceiver system including a multicarrier transmitter that transmits data in transmit blocks and a multicarrier receiver that receives data in receive blocks, wherein said transmitter is transmitting at the same rate that said receiver is receiving, comprising the steps of;

(a) generating initial values for a set of frequency-domain echo parameters and a set of corresponding time-domain echo parameters, (b) block multiplying a frequency-domain transmit block by the set of frequency-domain echo parameters to produce a frequency-domain echo component, (c) converting the frequency-domain transmit block to a time-domain transmit block, (d) subtracting the end of the previous time-domain transmit block from the end of the current time-domain transmit block to produce a tail-adjusted transmit block, (e) performing a convolution of the tail-adjusted transmit block and the time-domain echo parameters to produce a time-domain echo component, (f) subtracting the time-domain echo component from a time-domain receive block, (g) converting the resulting signal to the frequency-domain to produce a frequency-domain receive block, (h) subtracting the frequency-domain echo component from the frequency-domain receive block to produce an echo-free receive block, (i) updating the frequency-domain echo parameters by comparing the echo-free receive block to the frequency-domain transmit block, (j) updating the time-domain echo parameters, if a predetermined condition is met, by converting the frequency-domain echo parameters to the time-domain, and (k) repeating steps (b) through (j) for each received block.

* * * * *